United States Patent
Chen et al.

(10) Patent No.: US 9,853,678 B2
(45) Date of Patent: *Dec. 26, 2017

(54) ELECTRONIC DEVICE

(71) Applicant: MediaTek Singapore Pte. Ltd., Singapore (SG)

(72) Inventors: Jie Chen, Shenzhen (CN); Ting-Huan Lee, Taipei (TW); Jian Wu, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,430

(22) Filed: Jun. 27, 2016

(65) Prior Publication Data
US 2016/0308574 A1 Oct. 20, 2016

Related U.S. Application Data

(62) Division of application No. 14/255,151, filed on Apr. 17, 2014, now Pat. No. 9,408,252.

(30) Foreign Application Priority Data

Apr. 19, 2013 (CN) .......................... 2013 1 0136794
Sep. 27, 2013 (CN) .......................... 2013 1 0452300

(51) Int. Cl.
| | |
|---|---|
| *H04M 1/00* | (2006.01) |
| *H04B 1/40* | (2015.01) |
| *H04W 88/06* | (2009.01) |
| *H04B 1/00* | (2006.01) |
| *H04L 5/00* | (2006.01) |

(52) U.S. Cl.
CPC .............. *H04B 1/40* (2013.01); *H04B 1/005* (2013.01); *H04L 5/0021* (2013.01); *H04W 88/06* (2013.01)

(58) Field of Classification Search
CPC ......... H04B 1/40; H04B 1/005; H04L 5/0021; H04W 88/06
USPC ....................................... 455/553.1
See application file for complete search history.

(56) References Cited

U.S. PATENT DOCUMENTS

| | | | |
|---|---|---|---|
| 5,386,127 A | 1/1995 | Furuyama | |
| 9,408,252 B2 * | 8/2016 | Chen ...................... | H04W 88/06 |
| 2003/0214369 A1 | 11/2003 | Kearns | |
| 2004/0219880 A1 * | 11/2004 | Edmonson ............... | H04B 1/40 |
| | | | 455/41.1 |
| 2008/0242331 A1 | 10/2008 | Rofoufaran | |
| 2010/0062726 A1 * | 3/2010 | Zheng ................ | H04B 1/71637 |
| | | | 455/74 |
| 2010/0214066 A1 | 8/2010 | Lai | |

(Continued)

FOREIGN PATENT DOCUMENTS

| | | |
|---|---|---|
| CN | 102404021 | 4/2014 |
| CN | 202309698 | 7/2014 |

*Primary Examiner* — Ayodeji Ayotunde
(74) *Attorney, Agent, or Firm* — McClure, Qualey & Rodack, LLP

(57) ABSTRACT

Electronic devices are disclosed. The electronic device includes a circuit board. The circuit board contains a first transceiver module pad configured for soldering a first transceiver module thereon; and a second transceiver module pad configured for soldering a second transceiver module thereon. The first transceiver module is different from the second transceiver module, and layouts of the first and second transceiver module pads are the same.

9 Claims, 10 Drawing Sheets

(56) References Cited

U.S. PATENT DOCUMENTS

| | | |
|---|---|---|
| 2011/0064418 A1 | 3/2011 | Wang |
| 2012/0176976 A1 | 7/2012 | Wells |
| 2012/0294299 A1* | 11/2012 | Fernando ................. H04B 7/08 370/339 |
| 2013/0003709 A1 | 1/2013 | Kalhan |
| 2014/0252547 A1 | 9/2014 | Chen |

* cited by examiner

ELECTRONIC DEVICE

CROSS REFERENCE TO RELATED APPLICATIONS

This application is a Divisional of pending U.S. patent application Ser. No. 14/255,151, filed on Apr. 17, 2014, which claims priority of China Patent Application No. 201310136794.x and 201310452300.9, filed on Apr. 19, 2013 and Sep. 27, 2013, and the entirety of which is all incorporated by reference herein.

BACKGROUND OF THE INVENTION

Field of the Invention

The present invention relates to an electronic device, and in particular relates to an electronic device for multi-frequency transceiver paths.

Description of the Related Art

As communication technologies advances, portable electronic devices may now provide various types of network communications, such as Wideband Code Division Multiple Access (WCDMA), Time Division-Synchronous Code Division Multiple Access (TD-SCDMA), and so on. Nevertheless, since each type of network communication operates in a different specification, and each adopts a different form of transmission and reception paths, thus not only is a considerable area of the printed circuit board required, but also it becomes impossible to implement a circuit design on the printed circuit board that is compatible to both the transmission and reception paths. For example, given that the printed circuit board of the portable electronic device concurrently contains the transmission and reception paths which serve the frequency band A of the WCDMA and the frequency band B of the TD-SCDMA, if later the portable electronic device is required to be modified to support the frequency band A of the WCDMA and the frequency band B of the WCDMA, the component layout and routing on the printed circuit board is then required to be modified accordingly, and consequently the manufacturing cost and the production duration of the products are increased considerably.

Therefore, a circuit design which provides compatibility for both the transmission and reception paths and different network communication types is needed to allow portable electronic devices to have the flexibility to modify network communication types and operation frequency bands.

BRIEF SUMMARY OF THE INVENTION

A detailed description is given in the following embodiments with reference to the accompanying drawings.

An embodiment of an electronic device is disclosed. The electronic device comprises a circuit board. The circuit board comprises a first transceiver module pad and a second transceiver. The first transceiver module is configured for soldering a first transceiver module thereon, and the second transceiver module pad is configured for soldering a second transceiver module thereon. The first transceiver module is different from the second transceiver module, and layouts of the first and second transceiver module pads are the same.

Another embodiment of an electronic device is provided. The electronic device comprises a baseband processing device, an RF transceiver, a first transceiver module and a second transceiver module. The baseband processing device, configured to perform baseband signal processing. The RF transceiver, coupled to the baseband processing device, is configured to convert between a received baseband signal and a RF signal. The first transceiver module, coupled to the RF transceiver and an antenna module, is configured to transmit and receive signal of a first type. The second transceiver module, coupled to the RF transceiver and an antenna module, is configured to transmit and receive signal of a second type.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Further, the term "coupling" includes any direct or indirect electrical connection. Thus if a first device is coupled to a second device, it represents the fact that the first device may electrically connect to the second device directly, or may electrically connect to the second device via other devices or indirect means.

Figure 1:
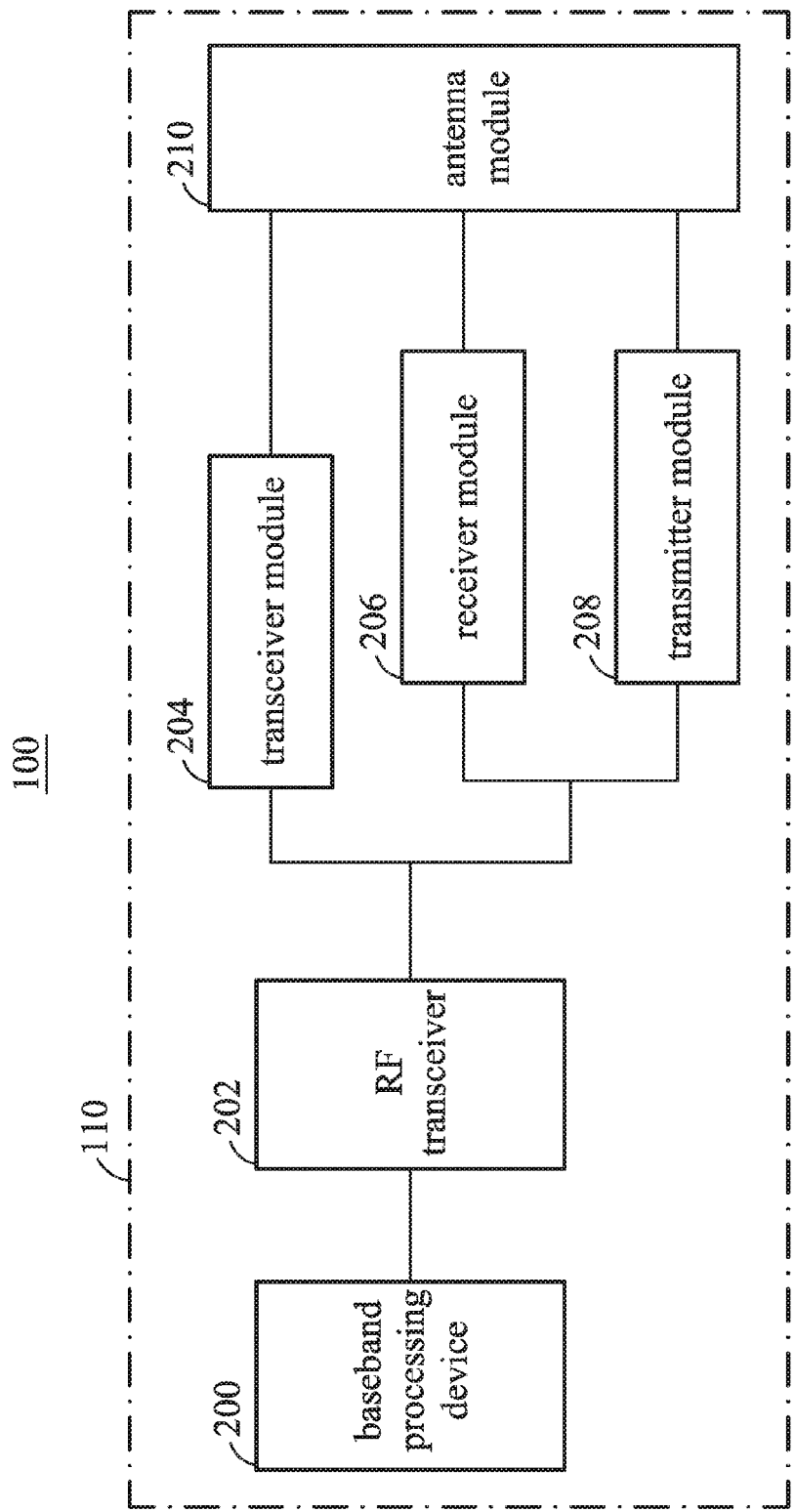
FIG. 1 is a block diagram of an electronic device 100.

FIG. 1 is a block diagram of an electronic device 100. The electronic device 100 may be a notebook computer, a mobile phone, a portable game device, tablet computer, and the like. The electronic device 100 may include a circuit board 110 and a plurality of devices soldered thereon. In one implementation, the devices soldered on the circuit board 110 include a baseband processing device 200, an RF transceiver 202, a transceiver module 204, a receiver module 206, a transmitter module 208, and an antenna module 210. The baseband processing device 200 may include a plurality of hardware devices to perform baseband signal processing, such as digital-to-analog conversion/analog-to-digital conversion, gain adjustment, modulation/demodulation, coding/decoding, and the like. The RF transceiver 202 receives an RF signal, converts the RF signal into a baseband signal to output to the baseband processing device 200, or it receives a baseband signal from the baseband processing device 200, and converts the received baseband signal to the RF signal. The receiver module 206 is a WCDMA transceiver module, coupled between the RF transceiver 202 and the antenna module 210, configured to receive a WCDMA signal from the antenna module 210, or transmit the WCDMA signal to the antenna module 210. The receiver module 206 and the transmitter module 208 are coupled between the antenna module 210 and the RF transceiver 202, configured to transmit and receive a TD-SCDMA signal, respectively. In one embodiment, the baseband processing device, the RF transceiver, the transceiver module, the receiver module, the transmitter module, and the antenna module are disposed on separate hardware devices (such as a standalone integrated circuit) or passive components by being soldered onto the circuit board 110, and coupled to adjacent devices via one or more transmission lines. The circuit board 110 may include a plurality of component solder pads, wherein each component solder pad is configured for soldering a corresponding device thereon. For example, a baseband processing device pad is configured for soldering the baseband processing device 200, an RF transceiver pad is configured for soldering the RF transceiver 202, and an antenna pad is configured for soldering the antenna module 210.

As shown in FIG. 1, for WCDMA applications, the transmission path and the reception path occupy different frequency bands, and therefore, the embodiment utilizes a multiplexer to implement the WCDMA transceiver module. As for TD-WCDMA applications, the transmission path and the reception path occupy the same frequency band. Since it is difficult to recognize signals of transmission path or receiver path in the same frequency band, using one component for transmitting and receiving the TD-SCDMA signals becomes problematic. As a consequence, two separate and dedicated modules (such as two filter modules) are required to implement the transmission path and the reception path for the TD-SCDMA. Accordingly, two separate and dedicated pads will be needed on the circuit board 110 for soldering the transceiver module 204 and the receiver module 206 for the TD-SCDMA signal.

Figure 2A:
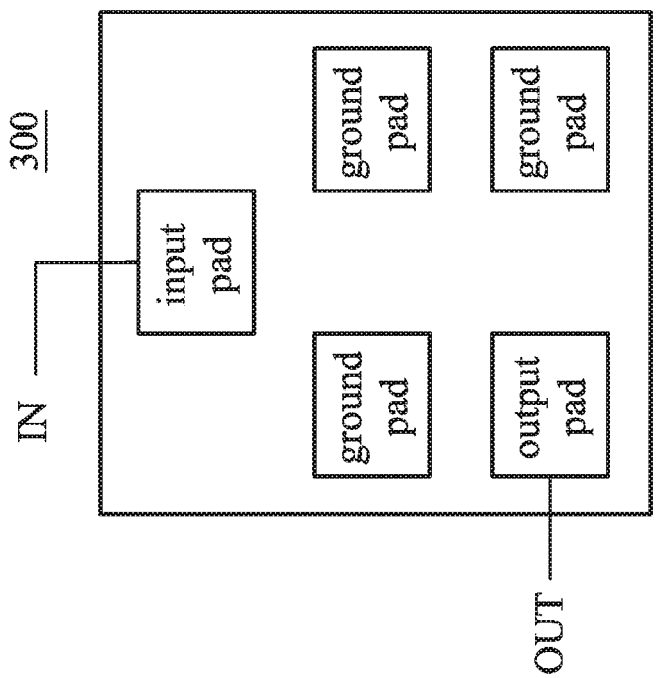
FIG. 2A is a schematic diagram of a solder pad 300 for soldering the transceiver module which transmits the TD-SCDMA signal.
Figure 2B:
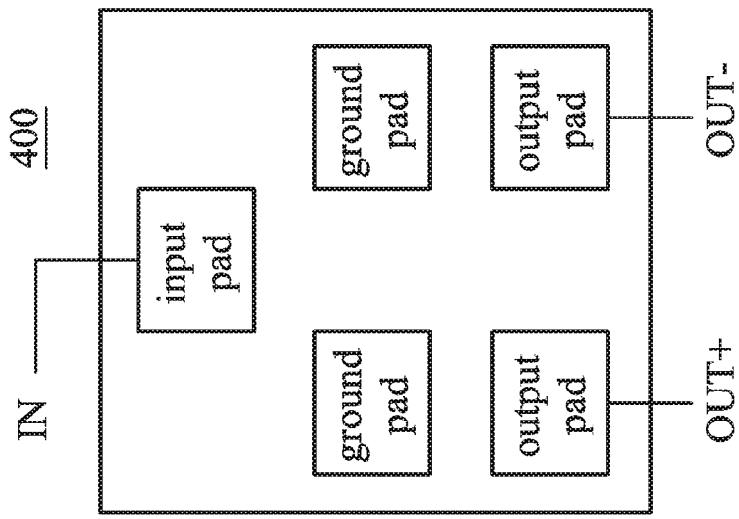
FIG. 2B is a schematic diagram of a solder pad 400 for soldering the receiver module which receives the TD-SCDMA signal.

FIG. 2A is a schematic diagram of a solder pad 300 for soldering the transmitter module which transmits the TD-SCDMA signal. FIG. 2B is a schematic diagram of a solder pad 400 for soldering the receiver module which receives the TD-SCDMA signal. As illustrated in FIG. 2A, the solder pad 300 for soldering the transmitter module 208 includes an input pad, an output pad and three ground pads. As for FIG. 2B, the solder pad 400 for soldering the receiver module 206 includes an input pad, two output pads and two ground pads. Therefore, in total there are 10 solder pads adopted by the TD-SCDMA transmission path and reception path. As a consequence, the package adopting separate and dedicated solder pads for transmitter and receiver modules not only requires more space, but also increases the pin count. Meanwhile, because the solder pad layouts for transmitting and receiving signals are different, this adds complication to the manufacturing processes. For example, when a client requests to replace the TD-SCDMA transceiver module with the WCDMA transceiver module, the manufacturer can only change the solder pads correspondingly.

Figure 3:
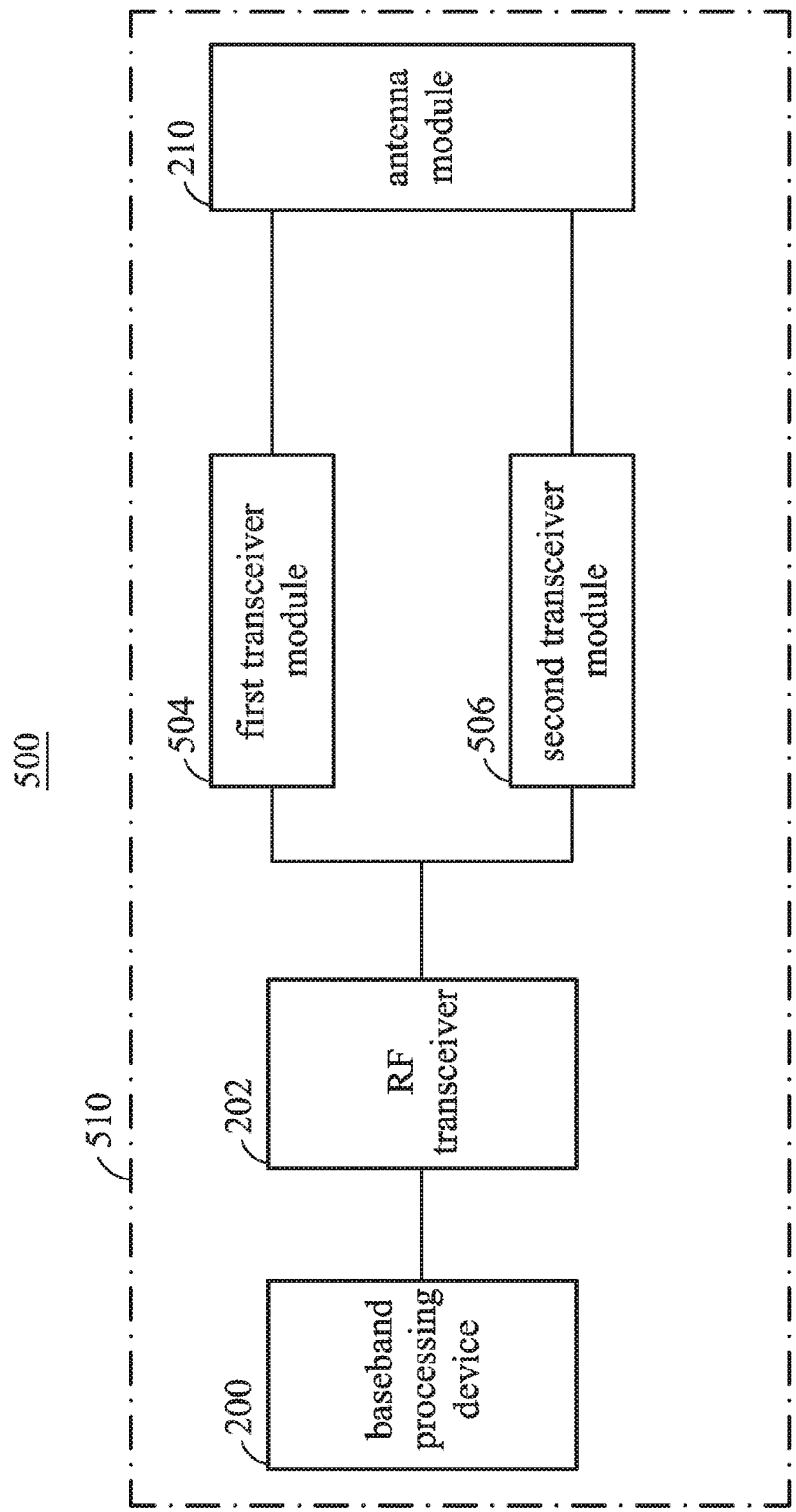
FIG. 3 is a block schematic of an electronic device 500 according to an embodiment of the invention.

Therefore, an electronic device 500 as in FIG. 3 is disclosed according to an embodiment of the invention. FIG. 3 is a block schematic of an electronic device 500 according to an embodiment of the invention. The electronic device 500 may be a notebook computer, a handset, a portable game device, a tablet computer, and the like. The electronic device may include circuit board 510 and a plurality of devices soldered on the circuit board 510. Based on one embodiment of the invention, the devices soldered on the circuit board include a baseband processing device 200, an RF transceiver 202, a first transceiver module 504, a second transceiver module 506 and an antenna module 210. The electronic devices 500 and 100 are distinct in that the electronic device 500 adopts one module, or the second transceiver module 506, in place of the receiver module 206 and the transmitter module 208 in FIG. 1.

For simplicity, in one embodiment of the invention, the first transceiver module is a WCDMA transceiver module, the second transceiver module is a TD-SCDMA transceiver module. It should be noted that FIG. 3 only illustrates a simplified block diagram which depicts the principle of the invention, in which only components relevant to the invention are shown. For example, in some embodiments, the electronic device 500 may further include a processing unit (such as a microprocessor) which controls the processes in the entire system. Consequently, the embodiments of the invention are not limited to the content shown in FIG. 3. Moreover, apart from using the second transceiver module 506 in place of the receiver module 206 and the transmitter module 208 in FIG. 1, the first transceiver module 504 and the second transceiver module 506 can use the same footprint for the package. Note that the embodiment replacing the transmission path and the reception path of processing the TD-SCDMA signal with the second transceiver module soldered on one single solder pad. Since the replaced second transceiver module can adopt the same footprint as that of the first transceiver module, consequently, even a client requests to change to another network communication type of signal for data transmission and reception, the manufacturer can still adopt the original solder pads, thereby simplifying the manufacturing processes and decreasing manufacturing costs. The solder pads for soldering the second transceiver module (TD-SCDMA transceiver module) will be used to illustrate the embodiment of the invention.

Figure 4:
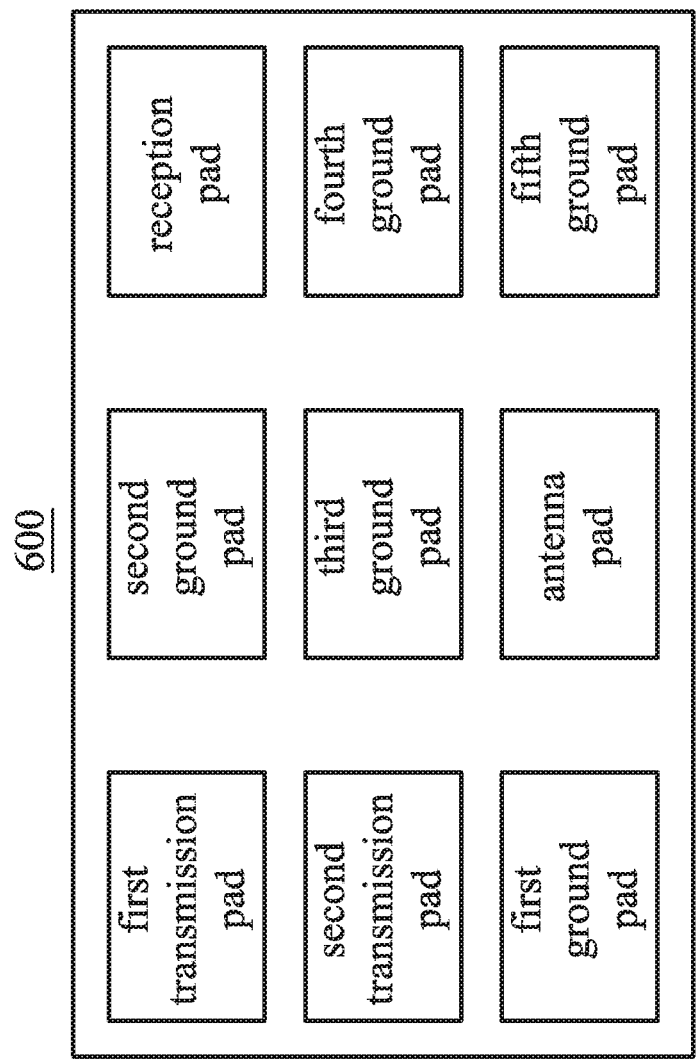
FIG. 4 is a schematic diagram of a transceiver module solder pad 600 according to an embodiment of the invention.

FIG. 4 is a schematic diagram of a transceiver module solder pad 600 according to an embodiment of the invention. The solder pad 600 includes 9 pads within a square frame, arranged in three rows and three columns. Specifically, the three pads in the first column are respectively the first transmission pad, the second transmission pad and the first ground pad; the three pads in the second column are respectively the second ground pad, the third ground pad and the antenna pad; the three pads in the third column are respectively the reception pad, the fourth ground pad and the fifth ground pad. Among all pads, the reception pad is used to receive the input signal IN, the first and second transmission pads are used to transmit the differential output signal OUT+ and OUT−, the antenna pad is used to multiplex the transmission signal and the reception signal to perform communication with the antenna, and the five ground pads are used to connect to the ground. In order to accomplish the objectives of alternately transmitting and receiving in the same frequency band at different time durations which TD-SCDMA requires, when operating in the transmission state of TD-SCDMA, the signal loss between the reception pad and the antenna pad is configured to be less than that between the first and second transmission pads. In other words, a low signal loss is present between the reception pad and the antenna pad, a high signal loss is present between the reception pad and the transmission pad. Meanwhile, the signal loss between the antenna pad and the reception pad remains at an all-time high when operating in the transmission state of TD-SCDMA. When operating in the reception state of TD-SCDMA, the signal loss between the antenna pad and the transmission pad is configured to be less than that between the antenna pad and the reception pad. That is to say, a low signal loss is present between the antenna pad and the transmission pad, a high signal loss is present between the antenna pad and the reception pad, while the signal loss between the transmission pad and the antenna always remains high when operating in the reception state of TD-SCDMA. As a result, the pad 600 not only decreases the pin count, but also significantly reduces the area of the printed circuit board in comparison to adopting the dedicated and separate solder pads for the transmitter module and receiver module. Moreover, since the solder pad 600 can be used for soldering the first transceiver module as well as the second transceiver module, the signal network communication type and frequency band allocation of the electronic device has increased flexibility. It is worth noting that, although the solder pad illustrated in the embodiment contains 9 pads, the number of pads is not limited to 9 and 9 is chosen for illustration purposes. The principle of the invention is met so long as two transceiver modules adopt the same solder pad footprint.

Figure 5:
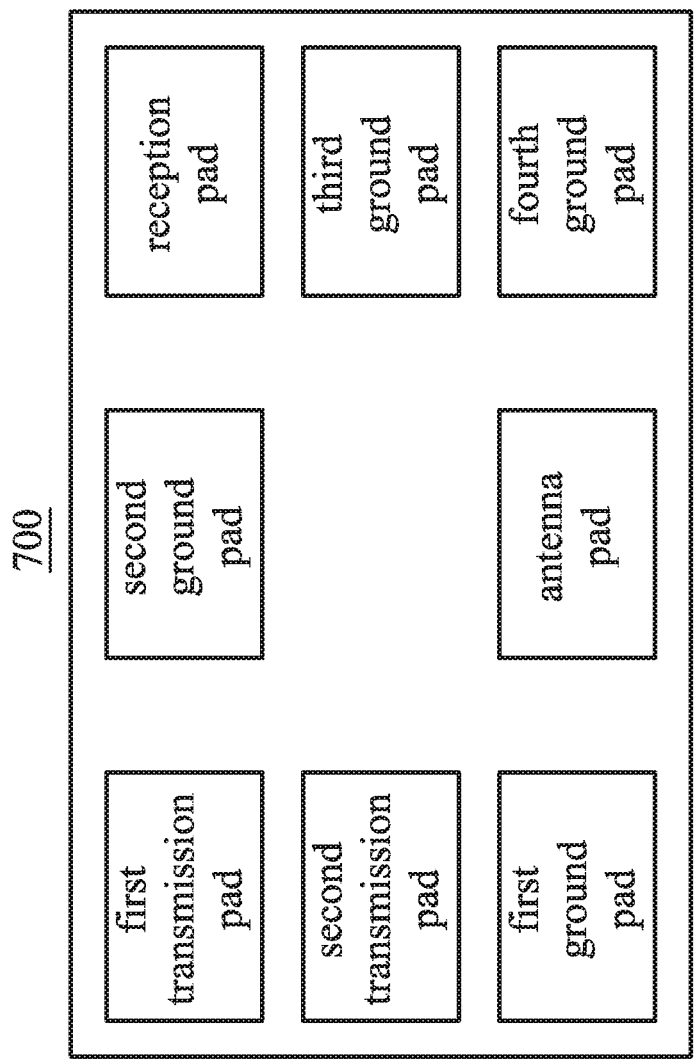
FIG. 5 is a schematic diagram of a transceiver module solder pad 700 according to another embodiment of the invention.

FIG. 5 is a schematic diagram of a transceiver module solder pad 700 according to another embodiment of the invention. The solder pad 700 includes 8 pads within a square frame, separately arranged in three columns. The first column includes three pads separately arranged, the second column includes two pads separately arranged, and the third column includes three pads separately arranged. In particularly, the three pads in the first column are in order of the first transmission pad, the second transmission pad and the first ground pad; the two pads in the second column are in order of the second ground pad and the antenna pad; the three pads in the third column are in order of the reception pad, the third ground pad and the fourth ground pad. In order to accomplish the objectives of alternately transmitting and receiving in the same frequency band at different time durations which TD-SCDMA technology adopts, when operating in the transmission state of TD-SCDMA, the signal loss between the reception pad and the antenna pad is configured to be less than that between the two transmission pads. In other words, a low signal loss is present between the reception pad and the antenna pad, and a high signal loss is present between the reception pad and the transmission pads. Meanwhile, the signal loss between the antenna pad and the reception pad always remains high when operating in the transmission state of TD-SCDMA. When operating in the reception state of TD-SCDMA, the signal loss between the antenna pad and the transmission pads is configured to be less than that between the antenna pad and the reception pad. That is to say, a low signal loss is present between the antenna pad and the transmission pads, and a high signal loss is present between the antenna pad and the reception pad, while the signal loss between the transmission pads and the antenna pad always remains high when operating in the reception state of TD-SCDMA. As a result, the solder pad 700 can be used for soldering the first transceiver module as well as the second transceiver module. In comparison to the solder pad 600 in FIG. 4, the pad 700 further decreases the pin count.

Figure 6:
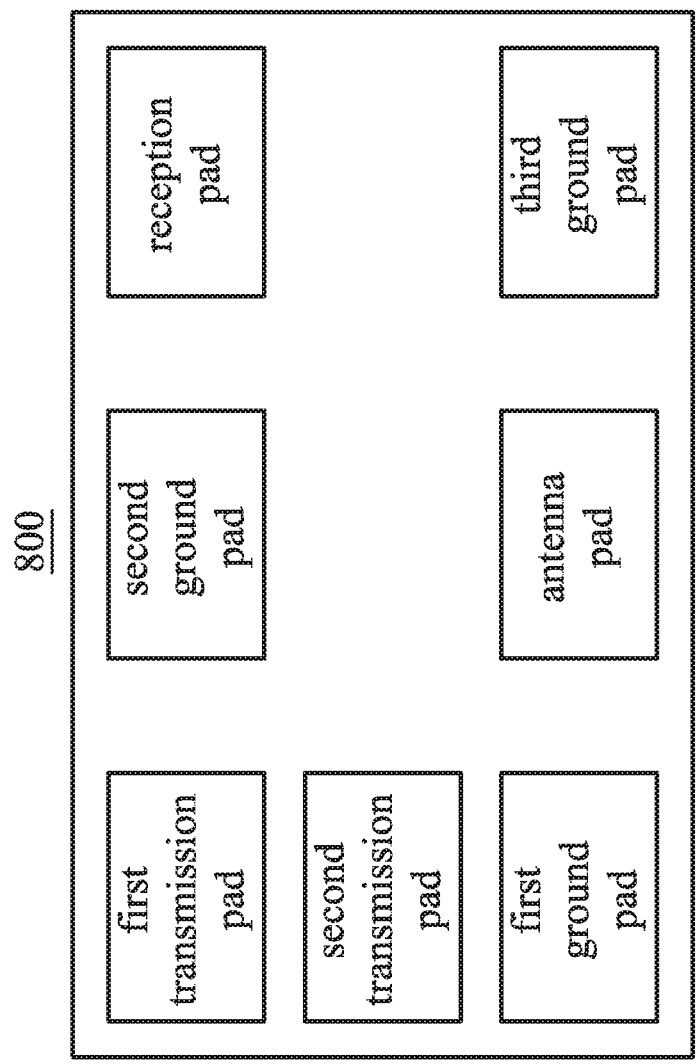
FIG. 6 is a schematic diagram of a transceiver module solder pad 800 according to yet another embodiment of the invention.

FIG. 6 is a schematic diagram of a transceiver module solder pad 800 according to yet another embodiment of the invention. The solder pad 800 includes 7 pads, namely first and second transmission pads, a reception pad, an antenna pad, and first, second and third ground pads. As a consequence, the solder pad 800 can be used for soldering the first transceiver module as well as the second transceiver module. In comparison to the solder pad 600 in FIG. 4 and the solder pad 700 in FIG. 5, the pad 800 further reduces the pin count.

Figure 7:
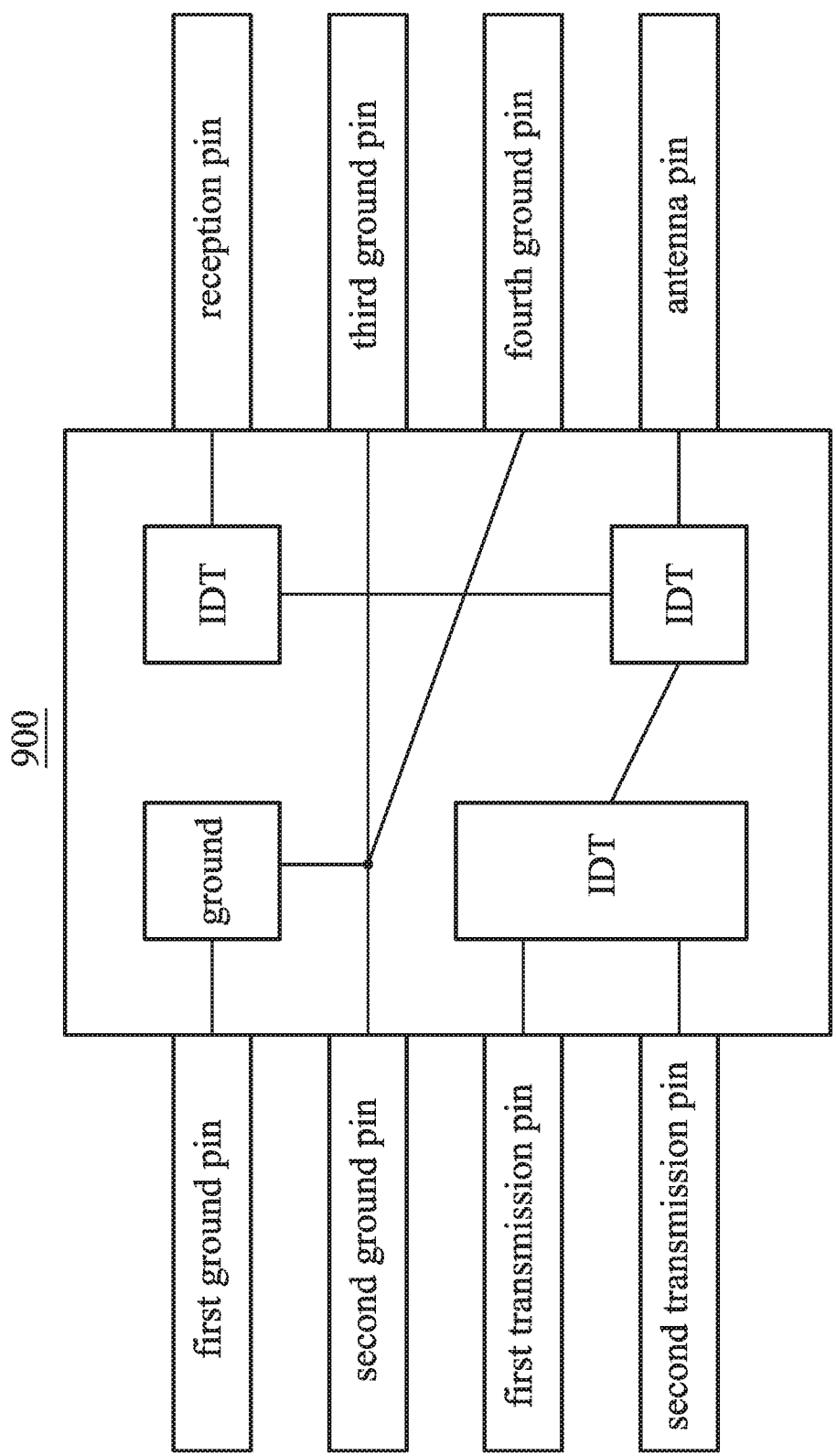
FIG. 7 is a schematic diagram of a transceiver module solder pad 900 according to still another embodiment of the invention.

FIG. 7 is a schematic diagram of a transceiver module solder pad 900 according to still another embodiment of the invention. Please also refer FIG. 1 and FIG. 3, the configuration of the transceiver module 900 can be applied to the transceiver module 204 in FIG. 1, the first transceiver module 504 and the second transceiver module 506 in FIG. 3. Please refer next to FIG. 5 and FIG. 7, when the solder pad footprint corresponding to the 8 pads is adopted, the first transceiver module 504 includes 8 pins which contain first and second transmission pins, a reception pin, an antenna pin and first through fourth ground pins. In order to reduce out-of-band noises, provide high-efficiency energy conversion, and increase transmission quality of the TD-SCDMA RF signal, the embodiment of the invention places three interdigital transducers (IDT) on the transceiver module 900, coupled to the first and second transmission pins, the reception pin and the antenna pin respectively, and provides two paths implemented by a polished surface of a substrate material with piezoelectric characteristics. As depicted in FIG. 7, one of the two paths is formed by the polished surface of the substrate material with the piezoelectric characteristics between the IDT coupled to the reception pin and the IDT coupled to the antenna pin, and the other one of the two paths is formed by the polished surface of the substrate material with the piezoelectric characteristics between the IDT coupled to the antenna pin and the IDT coupled to the transmission pin.

Those skilled in the art will recognize that, although 8 pins are adopted in the embodiment, other numbers of pad counts such as the transceiver module solder pad with 7 pads or 9 pads and other numbers of pin counts such as the transceiver module with 7 pins or 9 pins, which obey the principle of the invention, are within the scope of the invention.

Since the TD-SCDMA module in the embodiment adopts one transceiver module for transmitting and receiving the signal, the two separates modules are no longer required. Consequently the number of pads may be reduced, as well as reducing the required area of the printed circuit board. Further, different signal types of the WCDMA signal and the TD-SCDMA signal can use the same solder pad footprint for packaging, providing increased flexibility to clients for modifying the transceiver module to operate in different signal types and frequency bands.

Figure 8:
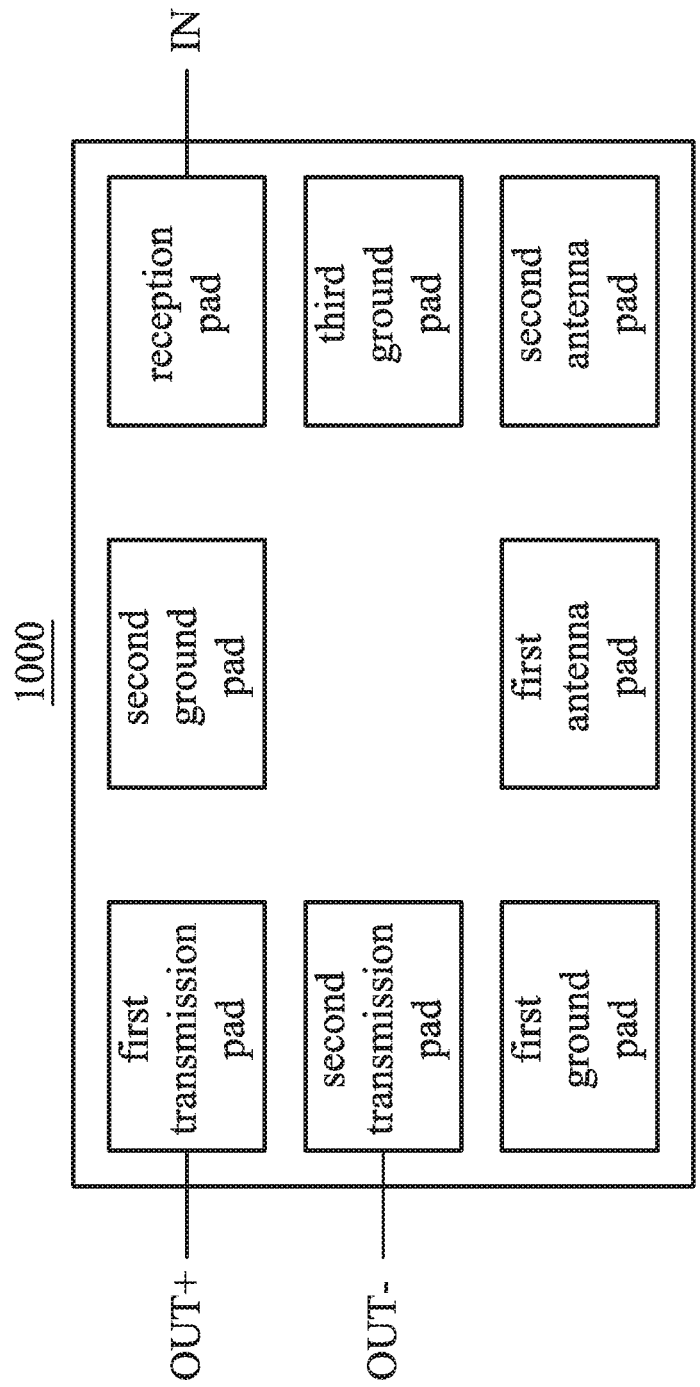
FIG. 8 is a schematic diagram of a transceiver module solder pad 1000 according to yet still another embodiment of the invention.

FIG. 8 is a schematic diagram of a transceiver module solder pad 1000 according to yet still another embodiment of the invention. As illustrated in FIG. 8, the solder pad 1000 contains 8 pads within the square frame, arranged in three columns. The first column includes three pads separately arranged, the second column includes two pads separately arranged, and the third column includes three pads separately arranged. Specifically, the three pads in the first column are in order of the first transmission pad, the second transmission pad and the first ground pad; the two pads in the second column are in order of the second ground pad and the antenna pad; the three pads in the third column are in order of the reception pad, the third ground pad and the second antenna pad. The reception pad is used to receive the input signal IN, the first and second transmission pads are used to transmit the differential output signal OUT+ and OUT−, the first antenna pad is used to transmit signals to communicate with the antenna, the second antenna pad is used to receive signals to communicate with the antenna, and the four ground pads are used to connect to the ground. In order to accomplish the objectives of alternately transmitting and receiving in the same frequency band at different time durations which TD-SCDMA technology adopts, when operating in the transmission state of TD-SCDMA, the signal loss between the reception pad and the antenna pads is configured to be less than that between the reception pad and the two transmission pads. In other words, a low signal loss is present between the reception pad and the antenna pad, and a high signal loss is present between the reception pad and the transmission pads. Meanwhile, the signal loss between the antenna pad and the reception pad always remains high when operating in the transmission state of TD-SCDMA. When operating in the reception state of TD-SCDMA, the signal loss between the antenna pad and the transmission pads is configured to be less than that between the antenna pad and the reception pad. That is to say, a low signal loss is present between the antenna pad and the transmission pads, and a high signal loss is present between the antenna pad and the reception pad, while the signal loss between the transmission pads and the antenna pad always remains high when operating in the reception state of TD-SCDMA. As a result, in comparison to the dedicated and separate solder pads which the transmitter and receiver modules are soldered thereon, the solder pad 1000 not only decreases the pin count but also significantly reduces the area of the printed circuit board.

Figure 9:
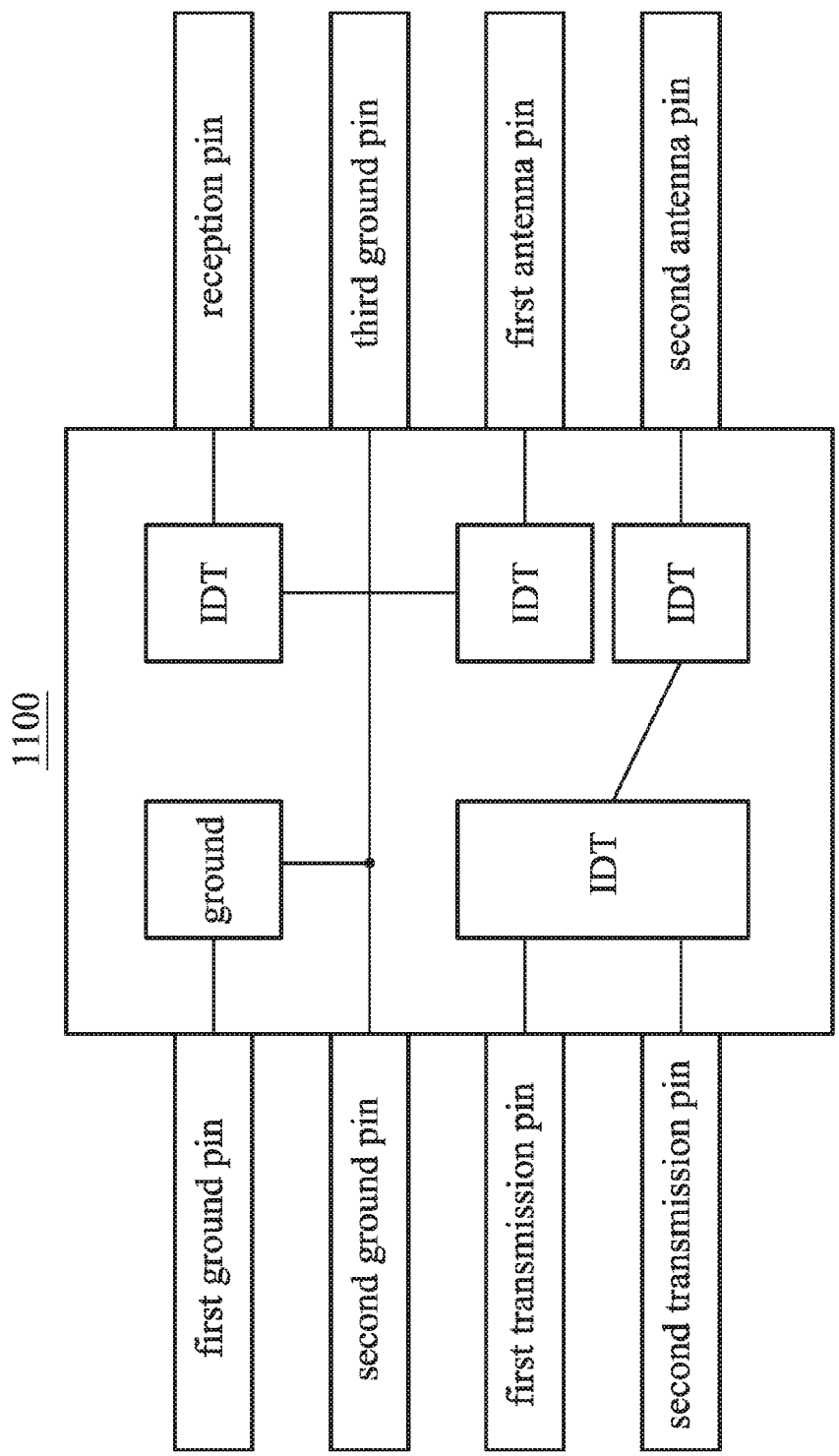
FIG. 9 is a schematic diagram of a transceiver module solder pad 1100 according to yet still another embodiment of the invention.

FIG. 9 is a schematic diagram of a transceiver module solder pad 1100 according to yet still another embodiment of the invention. As depicted in FIG. 9, the configuration of the transceiver module 1100 may be applied to the transceiver module 204 in FIG. 1, and the first transceiver module 504 and the second transceiver module 506 in FIG. 3. When adopting the solder pad footprint in FIG. 8, corresponding to 8 pads, the first transceiver module 504 includes 8 pins which contain first and second transmission pins, a reception pin, first and second antenna pins and first through third ground pins. In order to reduce out-of-band noises, provide high-efficiency energy conversion, and increase transmission quality of the TD-SCDMA RF signal, the embodiment of the invention places four IDTs on the transceiver module 1100, respectively coupled to the first and second transmission pins, the reception pin and the first and second antenna pins. The embodiment of the invention also provides two paths implemented by a polished surface of a substrate material with piezoelectric characteristics. As depicted in FIG. 9, one of the two paths is formed by the polished surface of the substrate material with the piezoelectric characteristics between the IDT coupled to the reception pin and the IDT coupled to the first antenna pin, and the other one of the two paths is formed by the polished surface of the substrate material with the piezoelectric characteristics between the IDT coupled to the second antenna pin and the IDT coupled to the transmission pins.

Figure 10:
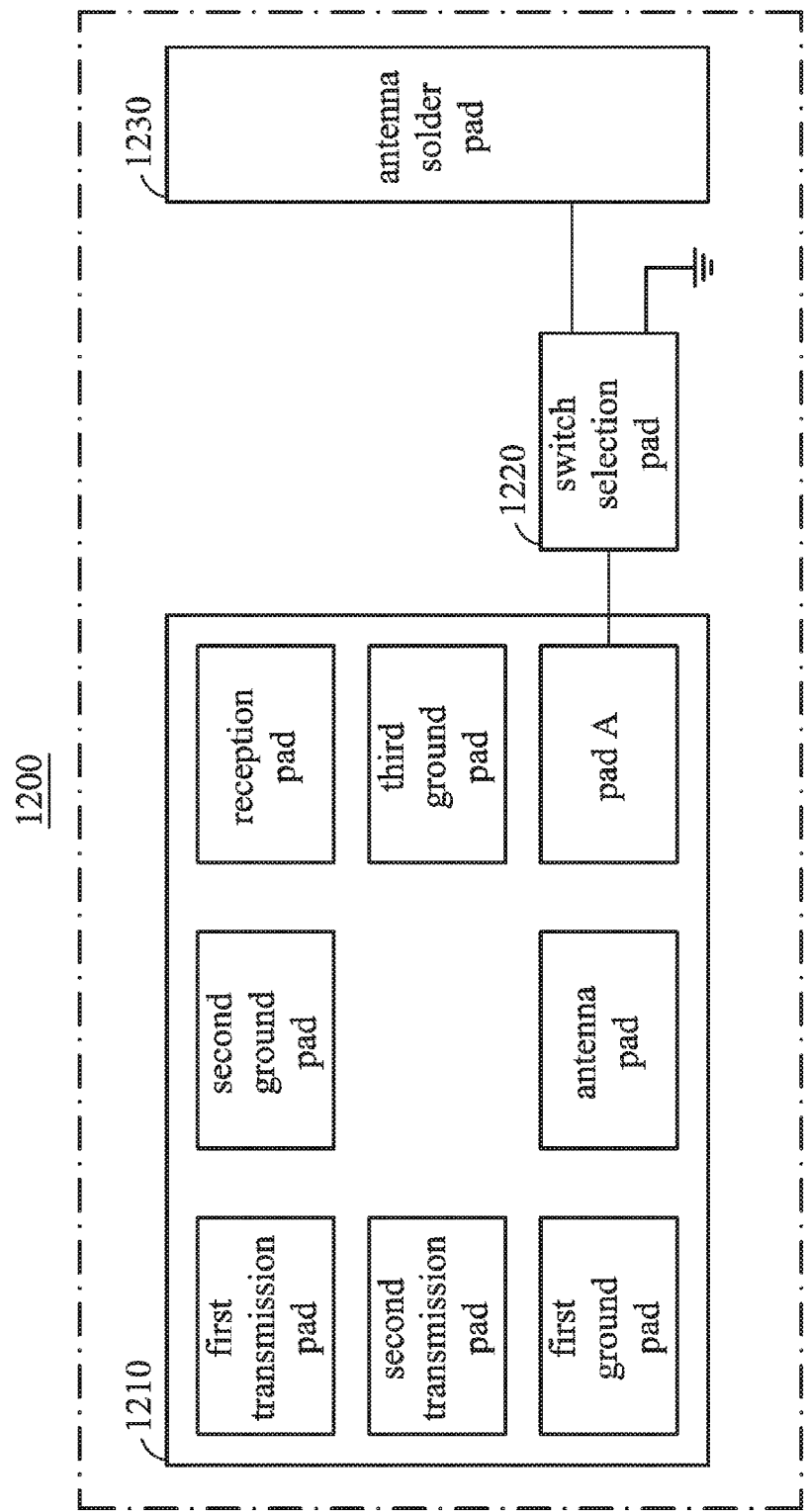
FIG. 10 is a schematic diagram of a circuit board 1200 of the electronic device according to an embodiment of the invention.

FIG. 10 is a schematic diagram of a circuit board 1200 of the electronic device according to an embodiment of the invention. As shown in FIG. 10, the circuit board 1200 includes a transceiver module solder pad 1210, a selection switch pad 1220 and an antenna solder pad 1230. Taking the transceiver module solder pad 1210 which includes 8 pads as an example, the 8 pads of the transceiver module solder pad 1210 may be laid out as the solder pad footprint 700 in FIG. 5 or the solder pad footprint 1000 in FIG. 8. People skilled in the art will recognize that, both of the solder pad footprint 700 in FIG. 5 and the solder pad footprint 1000 in FIG. 8 contain 8 pads, the primary difference lies in that the fourth ground pad in the solder pad footprint 700 corresponds to the second antenna pad in the solder pad footprint 1000. In the present embodiment, said pad is regarded as the A pad in the solder pad f1210. In order to make the solder pad footprint 700 and solder pad footprint 1000 compatible on the circuit board 1200, the selection switch pad 1220 is configured on the circuit board 1200. On the circuit board 1200, one end of the selection switch pad 1220 is connected to the A pad, the other two ends of the selection switch pad 1220 are respectively connected to the antenna solder pad 1230 and the ground. Thus, the selection switch pad 1220 connects the A pad to the ground, or it connects the A pad with the antenna solder pad 1240 by controlling a selection switch. Particularly when the solder pad footprint 700 is chosen to be adopted for the transceiver module solder pad 1210, the A pad (which corresponds to the fourth ground pad of the solder pad footprint 700) of the transceiver module solder pad 1210 is connected to the ground by controlling the selection switch pad 1220. When the solder pad footprint 1000 is chosen to be adopted for the transceiver module solder pad 1210, the A pad (which corresponds to the second antenna pad of the solder pad footprint 1000) of the transceiver module solder pad 1210 is connected to the antenna solder pad 1230 by controlling the selection switch pad 1220.

Those skilled in the art will recognize that the embodiments in FIGS. 8 through 10 adopt the transceiver module solder pads including 8 pads and 8 pins to illustrate the principle of the invention. Transceiver modules with other numbers of solder pads, such as 7 pads or 9 pads, and other numbers of pins, such as 7 pins or 9 pins, are within the scope of the invention.

Through the approaches disclosed in the embodiments, when the WCDMA signals and TD-SCDMA signals of different signal network communication types are applied to the packages with the same pad number but different solder pad footprints, the layout and routing on the printed circuit board is not required to be changed to allow the replacement for the transceiver module operated with different signal types and different frequency bands.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a circuit board, comprising:
a first transceiver module pad, configured for soldering a first transceiver module thereon; and
a second transceiver module pad, configured for soldering a second transceiver module thereon;
wherein the first transceiver module is different from the second transceiver module, and layouts of the first and second transceiver module pads are the same, wherein the first transceiver module comprises 8 pads within a square frame, arranged in three columns, wherein the first column includes three pads disposed separately, the second column includes two pads disposed separately, and the third column includes three pads disposed separately.

2. The electronic device of claim 1, wherein:
the three pads in the first column are a first transmission pad, a second transmission pad and a first ground pad;
the two pads in the second column are a second ground pad and an antenna pad;
the three pads in the third column are the reception pad, a third ground pad and a fourth ground pad.

3. An electronic device, comprising:
a circuit board, comprising:
a first transceiver module pad, configured for soldering a first transceiver module thereon; and
a second transceiver module pad, configured for soldering a second transceiver module thereon;
wherein the first transceiver module is different from the second transceiver module, and layouts of the first and second transceiver module pads are the same, wherein the first transceiver module comprises 9 pads within a square frame, arranged in three rows and three columns and disposed separately.

4. The electronic device of claim 3, wherein:
the three pads in the first column are a first transmission pad, a second transmission pad and a first ground pad, respectively;
the three pads in the second column are a second ground pad, a third ground pad and the antenna pad, respectively;
the three pads in the third column are the reception pad, a fourth ground pad and a fifth ground pad, respectively.

5. An electronic device, comprising:
a circuit board, comprising:
a first transceiver module pad, configured for soldering a first transceiver module thereon; and
a second transceiver module pad, configured for soldering a second transceiver module thereon;
wherein the first transceiver module is different from the second transceiver module, and layouts of the first and second transceiver module pads are the same, wherein the circuit board further comprising:
a selection switch pad, configured for soldering a selection switch thereon;
wherein the selection switch is compatible with different transceiver modules with same number of solder pads.

6. An electronic device, comprising:
a baseband processing device, configured to perform baseband signal processing;
an RF transceiver, coupled to the baseband processing device, configured to convert between a received baseband signal and an RF signal;
a first transceiver module, coupled to the RF transceiver and an antenna module, configured to transmit and receive signals of a first type; and
a second transceiver module, coupled to the RF transceiver and an antenna module, configured to transmit and receive signals of a second type,
wherein a solder pad footprint of a solder pad for soldering the first transceiver module is the same as that for soldering the second transceiver module.

7. The electronic device of claim 6, wherein:
a first inter digital transducer (IDT), a second IDT and a third IDT are further disposed on the first transceiver module, respectively coupled to an antenna pin, a transmission pin and a reception pin of the first transceiver module.

8. The electronic device of claim 7, wherein:
a path is formed by a polished surface of a substrate material with a piezoelectric characteristics between the third IDT coupled to the reception pin and the first IDT coupled to the antenna pin.

9. The electronic device of claim 7, wherein:
a path is formed by a polished surface of a substrate material with a piezoelectric characteristics between the first IDT coupled to the antenna pin and the second IDT coupled to the transmission pin.

* * * * *